Patented Apr. 25, 1939

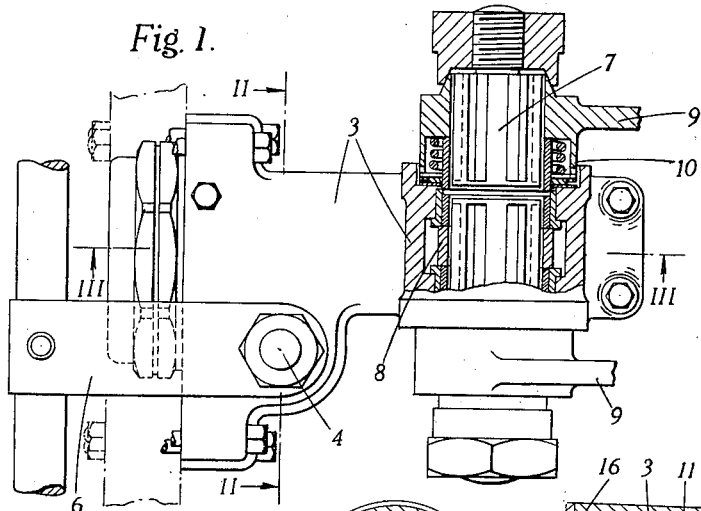
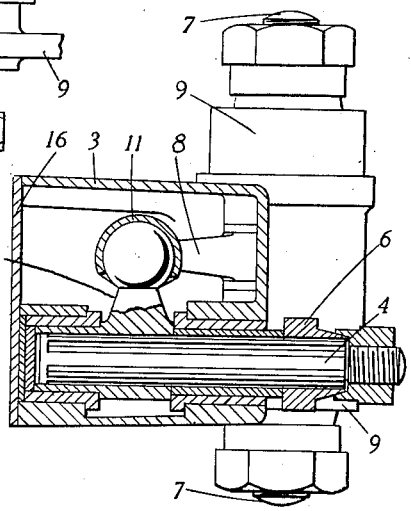
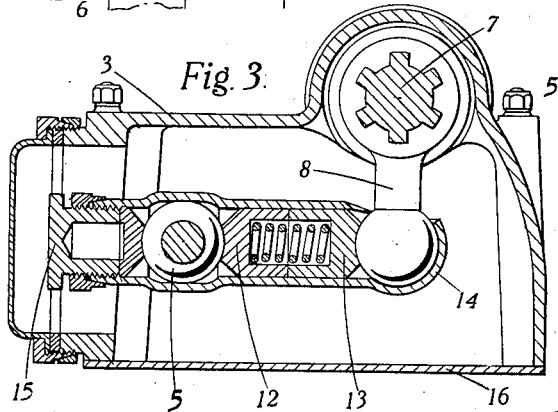
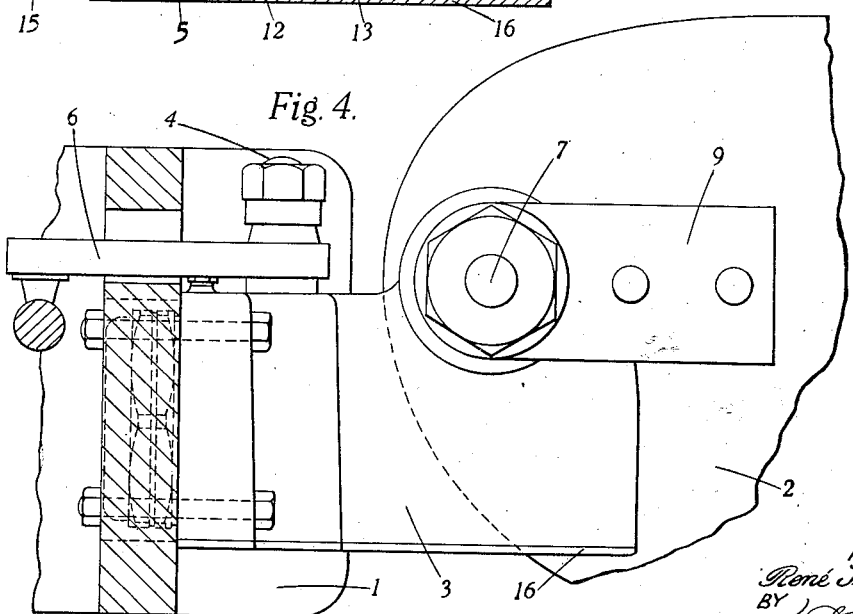

2,155,513

UNITED STATES PATENT OFFICE 2,155,513

HINGE MECHANISM FOR THE MOVING OR CONTROL SURFACES OF AIRCRAFT

René Tampier, Boulogne-sur-Seine, France

Application June 25, 1938, Serial No. 215,938
In Great Britain July 29, 1937

8 Claims. (Cl. 74—469)

This invention relates to hinge mechanisms for the moving or control surfaces of aircraft and has for its object the provision of a compact, efficient and enclosed mechanism by means of which an aileron or like control surface can be hingedly secured to a wing and moved by a lever, pivoted at right angles to the hinge pivot, and to this end the present invention comprises a casing, a lever or hinge arm secured upon a shaft rotatably mounted in bearings at one end of said casing, a control lever secured to a shaft disposed at right angles to the first mentioned shaft, mounted in bearings at the opposite end of the casing, crank members extending from each shaft within the casing, and means for connecting the free ends of said crank members together.

An embodiment of the invention will now be described with reference to the accompanying drawing, in which:

Figure 1 is a plan with part thereof in section showing a construction of the hinge mechanism;

Figure 2 is a section on the line II—II of Figure 1;

Figure 3 is a section on the line III—III of Figure 1, and,

Figure 4 is a side elevation showing the hinge mechanism employed for connecting an aileron to a wing, parts of the mechanism not being on the same scale as in the preceding figures.

1 is part of the fixed wing, 2 is part of the aileron and 3 is the casing containing the hinge mechanism. This casing is of generally rectangular shape and consists of a substantially rectangular casing adapted to be secured to the rear edge of the wing 1, said casing being provided adjacent one end with a bearing in which is mounted a shaft 4 provided adjacent its inner end with a short ball-ended crank arm 5 disposed at right angles to the shaft and projecting into the casing, an operating lever 6 being secured to the outer end of said shaft. A further bearing member is provided at the opposite end of the casing adapted to receive a second shaft 7 disposed at right angles to the first named shaft 4, said second shaft 7 being provided with a short ball-ended crank arm 8. The second shaft which constitutes the hinge pin for the aileron is provided on its ends with arms 9, 9 adapted to be connected to the aileron. A spring pressed friction member 10 is interposed between each of the hinge arms 9, 9 and the casing 3 for the purpose of damping undesired oscillations of the aileron. The ball ends of the crank arms 5, 8 are connected together by a member 11 which contains two socket members 12, 13 in the form of spring loaded plungers which maintain one of the ball ends pressed against a socket 14 at one end of the member 11 and the other ball end against a socket member 15 at the other end, the latter socket member being adjustably mounted in the member 11 to vary the pressure of the plungers on the ball ends.

The casing 3 is formed with an open bottom to enable the parts to be assembled and is packed with grease, the bottom being then closed by a plate 16.

The operating lever 6 is connected in the usual manner to the cockpit by rods, the operation of which produces the desired movement of the aileron by the rotation of the shaft 7 constituting the hinge pin of said aileron.

While the crank arms are described as being furnished with ball ends it will be obvious that any other form of joint, such as a fork, capable of giving an equivalent movement, may be employed.

What I claim is:

1. Hinge mechanism for the moving or control surfaces of aircraft, comprising a casing, a lever or hinge arm secured upon a shaft rotatably mounted in bearings at one end of said casing, a control lever, secured to a shaft disposed at right angles to the first mentioned shaft, mounted in bearings at the opposite end of the casing, crank members extending from each shaft within the casing, and means for connecting the free ends of said crank members together.

2. In hinge mechanism for the moving or control surfaces of aircraft, the combination with the elements claimed in claim 1, of ball ends on the crank members, a member connecting said crank members together and sockets in said member for engaging said ball ends.

3. In hinge mechanism for the moving or control surfaces of aircraft, the combination with the elements claimed in claim 1, of ball ends on the crank members, a member connecting said crank members together, a socket at one end of said connecting member for receiving one ball end, a socket at the other end of said connecting member for receiving the other ball end, and two movable socket members in the form of spring loaded plungers for maintaining said ball ends pressed against the socket ends of the connecting member.

4. In hinge mechanism for the moving or control surfaces of aircraft, the combination with the elements claimed in claim 1, of ball ends on the crank members, a member connecting said crank members together, a socket at one end of said connecting member for receiving one ball end, a socket at the other end of said connecting member for receiving the other ball end, two movable socket members in the form of spring loaded plungers for maintaining said ball ends pressed against the socket ends of the connecting member, and means for adjusting one of said ball ends for varying the pressure of the spring loaded plungers on said ball ends.

5. Hinge mechanism for the moving or control surfaces of aircraft, comprising a casing, a lever or hinge arm secured upon a shaft rotatably mounted in bearings at one end of said casing, a control lever, secured to a shaft disposed at right angles to the first mentioned shaft, mounted in bearings at the opposite end of the casing, crank members extending from each shaft within the casing, means for connecting the free ends of said crank members together, and a friction device between the lever or hinge arm and the casing.

6. In hinge mechanism for the moving or control surfaces of aircraft, the combination with the elements claimed in claim 1, of ball ends on the crank members, a member connecting said crank members together, sockets in said member for engaging said ball ends, and a friction device between the lever or hinge arm and the casing.

7. In hinge mechanism for the moving or control surfaces of aircraft, the combination with the elements claimed in claim 1, of ball ends on the crank members a member connecting said crank members together, a socket at one end of said connecting member for receiving one ball end, a socket at the other end of said connecting member for receiving the other ball end, two movable socket members in the form of spring loaded plungers for maintaining said ball ends pressed against the socket ends of the connecting member, and a friction device between the lever or hinge arm and the casing.

8. In hinge mechanism for the moving or control surfaces of aircraft, the combination with the elements claimed in claim 1, of ball ends on the crank members, a member connecting said crank members together, a socket at one end of said connecting member for receiving one ball end, a socket at the other end of said connecting member for receiving the other ball end, two movable socket members in the form of spring loaded plungers for maintaining said ball ends pressed against the socket ends of the connecting member, means for adjusting one of said ball ends for varying the pressure of the spring loaded plungers on said ball ends, and a friction device between the lever or hinge arm and the casing.

RENÉ TAMPIER.